Patented Oct. 25, 1938

2,133,941

UNITED STATES PATENT OFFICE 2,133,941

HYDROLYSIS OF TITANIUM SALT SOLUTIONS

Benjamin Wilson Allan, Baltimore, Md., assignor to American Zirconium Corporation, Baltimore, Md., a corporation of Maryland No Drawing. Application April 4, 1936, Serial No. 72,768

4 Claims. (Cl. 23—202)

This invention relates to titanium dioxide and has particular reference to a new and novel method of producing pigmentary titanium dioxide by hydrolysis of titanium salt solutions. More particularly it refers to a new and novel method of accelerating the hydrolysis of such solutions, whereby improved tinting strength is obtainable with substantially the same amounts of seeding agent as used by the prior art. In particular, it contemplates improvement in tinting strength by the addition to the solution of small quantities of seeding agent at various stages of the hydrolysis, instead of at the beginning.

Titanium oxide is one of the most popular of the pigments used in the paint industry, because of its chemical inertness and its exceptionally good covering power. It is ordinarily made from rutile (a native titanium oxide mineral) or from ilmenite (an iron titanate mineral). The titanium is put into solution in any desired manner, such as by fusion with an alkali or by attack of the mineral with strong sulfuric acid. The solutions are ordinarily purified by removal, to some extent, of their iron content. In order to get titanium oxide of good pigmentary properties it has been found necessary to hydrolize the titanium oxide from fairly acid solutions, rather than to precipitate the oxide with alkaline materials.

The most economical method for the production of titanium oxide is to start with the mineral ilmenite and attack the mineral with hot concentrated sulfuric acid, generally using sufficient sulfuric acid to form normal salts with all of the iron and titanium present. The attack mass is then leached with water or with weak sulfuric acid, recovered later in the process, the resulting solution containing titanium and iron sulfates with some free acid. In some cases it is advantageous to use smaller percentages of sulfuric acid, in which case the titanium is present as a compound between $TiOSO_4$ and $Ti(SO_4)_2$. The amount of sulfuric acid in the solution is expressed as factor of acidity (F. A.), $TiOSO_4$ representing zero factor of acidity and $Ti(SO_4)_2$ representing 100% F. A.

The sulfate solutions are then reduced so that the iron is present in the ferrous condition, so that iron will not precipitate upon hydrolysis of the solutions. Suspended matter is ordinarily removed by filtration or other form of clarification and the solution is then ready for hydrolysis.

Some solutions are hydrolizable by mere boiling, but solutions made by treatment of ilmenite with acid in the manner above described, produce rather poor yields of titanium oxide on simple boiling. This difference in solutions I attribute to the form of the titanium oxide before solution. Where solutions are made from ortho titanic acid or where ortho titanic acid has been formed and redissolved, hydrolysis is a simple process; where the titanium oxide is dissolved from other modifications, the process of hydrolysis becomes more difficult. The difference is probably due to the fact that ortho titanic acid goes into colloidal rather than into true solution.

Various investigators have suggested different methods of producing solutions which are readily hydrolizable, in every case adding to the solution some titanium oxide which has been precipitated in the form of ortho titanic acid, or which goes into colloidal rather than true solution. In some cases the precipitate is formed in the solution and later dissolved, the hydrolysis being one continuous operation. In other cases a titanium oxide seeding agent is prepared on the outside and thereafter added to the solution.

Typical seeding agents prepared in solution are disclosed in the Blumenfeld Reissue Patents 17,429, 17,430 and 18,854. In this type of seeding, the seeding agent is prepared in situ by diffusing solutions of different concentration into one another; and the seeding agent is of necessity all present at the beginning of the hydrolysis.

The other method of seeding, the addition of seeding agents prepared separately, is well illustrated by the Mecklenburg Reissue Patent 18,790, by the Rhodes Patent 1,922,328 and by the Richter Patent 1,947,226. Such an agent, and my preferred seeding agent, is described in my co-pending application Serial #731,998, filed June 22, 1934 Patent 2,040,823; this seeding agent comprises a dry gel of titanium dioxide, prepared by neutralizing a titanium salt solution with an alkaline material.

These last mentioned seeding agents are added conventionally to the solution to be hydrolized, at the boiling point. Good yields are generally obtainable by these methods, together with good tinting strength.

I have discovered that if the seeding agent be added to the hydrolysis solution at various stages in the precipitation, the resultant precipitate is much easier to precipitate, and the calcined pigment has in general, much better color and a definitely increased tinting strength of the order of 5 to 10%. I attribute this improvement in properties to the improved physical structure of the precipitate; I believe that when a seeding agent is added, it is gradually occluded with the hydrolytically precipitating titanium oxide, so that after a time, the hydrolysis solution produces a precipitate somewhat different in structure than the first precipitate; and the further addition of seeding agent changes the character of the precipitate back to that obtained originally, this precipitate being of such a physical nature as to calcine to a better tinting strength pigment. The improvement of color is probably due both to the physical structure, and to the fact that probably less impurities are occluded.

As a typical example of my invention, I prepared a titanium sulfate solution which, when ready for hydrolysis, had the following analysis:

| | | |
|---|---|---|
| $TiO_2$ | grams per liter | 198 |
| Fe | do | 96 |
| Total $H_2SO_4$ | do | 542 |
| Free acid | do | 132 |
| Active acid | do | 374 |
| Factor of acidity | per cent | 54.5 |

This solution was heated to boiling, and 2% of a titanium oxide gel containing 10% $TiO_2$ prepared as described in my co-pending application Serial #731,998, filed June 22, 1934, Patent 2,040,823 were added. Boiling was continued for 6 hours; the pigment was filtered, washed and calcined at 900° C. after adding potassium carbonate as a conditioning agent. The resultant pigment was a slightly creamy white pigment, with very high tinting strength, numerically set at 94 on an arbitrary scale in use in our laboratory. The yield was 95%.

The same solution was then hydrolized, adding ¼% of the gel at the boiling point, ½% each hour for 3 hours, and ¼% at 5 hours. After 8 hours, the pigment was finished exactly as above. A 94.5% yield of pigment was obtained; it was much whiter and brighter than the first pigment, and had a tint of 98. While this 4% increase in tint seems rather small, it is of definite importance, particularly where composite pigments are to be made, where the higher tinting strength base permits of a cheaper composite, or a better product for the same money. The other principal difference lay in the fact that the filtration rate was 25% faster in the second case.

The above results were obtained in the laboratory. On plant scale operations, substantially greater differences are obtainable. For example, using solutions very similar to the above, plant hydrolyses were made, in the one case adding 1% of gel at the boiling point, in the other adding the gel in increments of ¼%, at hourly intervals. The color of the pigment obtained from the delayed seed was far superior; the tint was 93 against 85; the oil absorption was somewhat higher; the pigment was somewhat softer; and the precipitate filtered and settled about 33⅓% faster. The yields were almost identical.

As another example of my invention, I prepared 10 liters of a titanium sulfate solution of the following composition:

| | | |
|---|---|---|
| $TiO_2$ | grams per liter | 196 |
| Fe | do | 141 |
| $H_2SO_4$ | do | 607 |
| Free acid | do | 120 |
| Active acid | do | 360 |
| Factor of acidity | per cent | 50 |

The solution was split into two parts, and each heated to boiling simultaneously. A seed suspension was prepared following the disclosure of the Mecklenburg Reissue Patent 18,790; and 2.5% of the seed suspension was added to each of the two boiling solutions. In the first case, the entire quantity was added at the boiling point; in the second, the seed was added in increments, as follows:

¼% at boiling point; ½% at the end of the first, second, third and fourth hours; ¼% at the end of five hours. Where all the seed was added at once, 93.5% precipitation was obtained in three hours, increasing only to 94.5% in eight hours. The delayed seeding resulted in a 73% yield in three hours, and a 93.5% yield in eight hours.

The pigment properties of the precipitate, seeded at the boiling point, were considerably poorer than those obtained by delaying the seeding. The tint was increased from 83 to 90, the color was considerably brighter, and the filtration rate was increased by at least 50%.

The total amount of seeding agent has, within limits, a slight effect on the yields; but the exact manner of addition has little effect, except that somewhat better yields are obtainable by adding a slight increment of seeding agent toward the very end of the hydrolysis.

The use of increments of seeding agent added during the course of hydrolysis improves pigment properties over the single addition of seeding agent at the beginning, not only for the seeds shown, but for the seeding agents disclosed in the Rhodes and Richter patents above cited. I believe the phenomenon to be generic for all seeding agents used in the hydrolytic precipitation of titanium salt solutions.

I claim:

1. In the process of hydrolytically precipitating titanium oxide from a hydrolizable titanium salt solution which comprises heating the solution in the presence of a seeding agent, the improvement which comprises adding a portion only of the seeding agent to the hydrolysis solution at the boiling point, thereafter continuing the heating of the solution until a substantial amount of hydrolysis is effected and then adding another portion of the seeding agent and thereafter continuing the heating.

2. In the process of hydrolytically precipitating titanium oxide from a hydrolizable titanium salt solution which comprises heating the solution in the presence of a seeding agent, the improvement which comprises heating the titanium salt solution at the boiling point thereof in the presence of a portion only of the seeding agent until a substantial amount of hydrolysis is effected and then adding another portion of the seeding agent and thereafter continuing the heating.

3. In the process of hydrolytically precipitating titanium oxide from a hydrolizable titanium sulfate solution which comprises heating the solution in the presence of a seeding agent, the improvement which comprises heating the titanium sulfate solution at the boiling point thereof in the presence of a portion only of the seeding agent until a substantial amount of hydrolysis is effected and then adding another portion of the seeding agent and thereafter continuing the heating.

4. The process of claim 2 in which the seeding agent is a dry gel of titanium oxide.

BENJAMIN WILSON ALLAN.